United States Patent
King

(10) Patent No.: US 10,083,623 B2
(45) Date of Patent: Sep. 25, 2018

(54) FIREFIGHTER TRAINING FIXTURE

(71) Applicant: Chris King, Chicago, IL (US)

(72) Inventor: Chris King, Chicago, IL (US)

(73) Assignee: Chris King, Chicago, IL (US)

( * ) Notice: Subject to any disclaimer, the term of this patent is extended or adjusted under 35 U.S.C. 154(b) by 394 days.

(21) Appl. No.: 14/752,983

(22) Filed: Jun. 28, 2015

(65) Prior Publication Data

US 2015/0379883 A1    Dec. 31, 2015

Related U.S. Application Data

(60) Provisional application No. 62/018,537, filed on Jun. 28, 2014.

(51) Int. Cl.
*G09B 23/28* (2006.01)
*G09B 19/00* (2006.01)
*A62C 99/00* (2010.01)

(52) U.S. Cl.
CPC ............ *G09B 19/00* (2013.01); *A62C 99/009* (2013.01); *A62C 99/0081* (2013.01); *G09B 23/28* (2013.01); *G09B 23/285* (2013.01); *G09B 23/286* (2013.01)

(58) Field of Classification Search
CPC ...... G09B 9/00; A62C 99/0081; A62C 99/009
See application file for complete search history.

(56) References Cited

U.S. PATENT DOCUMENTS

| | | | | |
|---|---|---|---|---|
| 4,526,548 A | * | 7/1985 | Livingston | A62C 99/0081 434/226 |
| 8,360,782 B1 | * | 1/2013 | Temple | G09B 19/00 434/226 |
| 2003/0106276 A1 | * | 6/2003 | Tallman | E04B 9/127 52/506.06 |
| 2005/0233289 A1 | * | 10/2005 | Hoglund | A62C 99/0081 434/226 |
| 2009/0188188 A1 | * | 7/2009 | Rivet | A62C 99/0081 52/270 |
| 2012/0178071 A1 | * | 7/2012 | Burns | G02B 7/182 434/262 |

* cited by examiner

*Primary Examiner* — Robert J Utama
(74) *Attorney, Agent, or Firm* — Corridor Law Group, P.C.

(57) ABSTRACT

A firefighter training fixture for simulating a ceiling pull maneuver includes a pair of side sections and a ceiling section. The ceiling section is interposed between an upper portion of each of the side sections. The ceiling section has at least one compartment for receiving at least one ceiling panel. In some embodiments, the side section has adjustable arms that can increase the height of the ceiling section. In one embodiment, the receiving compartments are configured to receive a drywall panel. The ceiling section can also have piping extending across the receiving compartments to simulate electrical conduit or utility piping encountered by firefighters in the field. In some embodiments, a step ladder is attached to the fixture to allow for convenient installation of ceiling panels into the compartments.

1 Claim, 4 Drawing Sheets

FIREFIGHTER TRAINING FIXTURE

CROSS-REFERENCE TO RELATED APPLICATIONS

This application is related to and claims priority benefits from U.S. provisional patent application No. 62/018,537 filed on Jun. 28, 2014. The '573 application is hereby incorporated by reference in its entirety.

FIELD OF THE INVENTION

The present invention relates to firefighting training equipment. In particular, the invention relates to a fixture for teaching the skills of ceiling pull and overhaul.

BACKGROUND OF THE INVENTION

While fighting fires, firefighters often have to breach a ceiling. Breaching the ceiling allows firefighters to check for fire extension by assessing the ceiling above them before moving into the building. This helps prevent firefighters from moving too far into a building to only have fire above or behind them which can lead to ceiling collapses.

Breaching is often accomplished using a pike pole, which is sometimes referred to as a plaster hook. The pike pole is a long pole with a hook and point attached at one end that can be used to cut into and tear down ceilings, which is also known as a ceiling pull.

The ceiling pull is an important, potentially lifesaving technique that a well-trained firefighter should know how to accomplish. Traditionally, firefighters train for the ceiling breach using one of two methods.

The first method involves employing a machine that measures overhead push and pull forces. The machine typically employs an assembly of weights, pulleys and/or springs to simulate the forces needed to perform a ceiling pull. Usually, one portion of the machine will have a board with weights mounted thereon that the firefighter must push up using the pike hook to simulate the pushing force needed to cut into a ceiling. Another portion of the machine will usually have a hook connected to a pulley system or spring that the firefighter can engage with the pike hook. This part of the machine simulates the pulling force needed to pull down the ceiling.

While useful for improving a firefighter's strength and endurance, training on traditional ceiling pull machines is not ideal, as these machines offer only a rough approximation that does not adequately simulate a true ceiling pull. In this regard, firefighters can only engage the push and pull portions of the training machine individually. As a result, the firefighter does not get the full experience of having tension acting in both the upward and downward motion of a single stroke. Furthermore, these training machines do not simulate a real-life firefighting experience, with falling debris and obstacles such as electrical conduit or electrical wiring interfering with a real-life ceiling pull.

The second method used to train firefighters to perform a ceiling pull and breach is to practice on dilapidated buildings that are scheduled to be torn down. This method is not ideal, as it requires a fire department to continually seek out new training locations.

What is needed is an easily movable device that enables firefighters and trainees to practice the real-world movements, skills and techniques involved in performing a ceiling pull in a safe, convenient, affordable and easily repeatable scenario.

SUMMARY OF THE INVENTION

A training fixture includes a ceiling section mounted on at least one side section. If only one side section is used, the fixture can be leaned against or attached to a wall. In other embodiments, the fixture is configured to be stable with only one side section.

In some embodiments, the side section(s) can include adjustable arms that allow the height of the ceiling section to vary. The ceiling section includes one or more compartments into which with ceiling panels, such as drywall panels, so that firefighter trainees can learn and practice the ceiling pull and breach maneuvers. In some embodiments, the compartments can also include piping and/or wiring to simulate the electrical conduit, wiring, and fluid (water and gas) utility pipes often found in ceilings. In some embodiments, at least one of the pipes can be connected to a water source and configured to spray water on the firefighter trainees. These features provides for more realistic training, as firefighters need to be able to perform the ceiling pull while avoiding obstacles in ceilings and/or being sprayed with water from a busted pipe and/or an overhead sprinkler system.

In some embodiments, an optional step ladder is attached to the training fixture to allow individuals to readily install ceiling panels into the compartments.

The training fixture can be formed from a variety of materials, including but not limited to wood, steel, plastic and aluminum. In some instances, aluminum is a preferred material as it is light and fire resistant, thereby allowing the fixture to be placed near open flames often used during training.

DETAILED DESCRIPTION OF PREFERRED EMBODIMENT(S)

Figure 1:
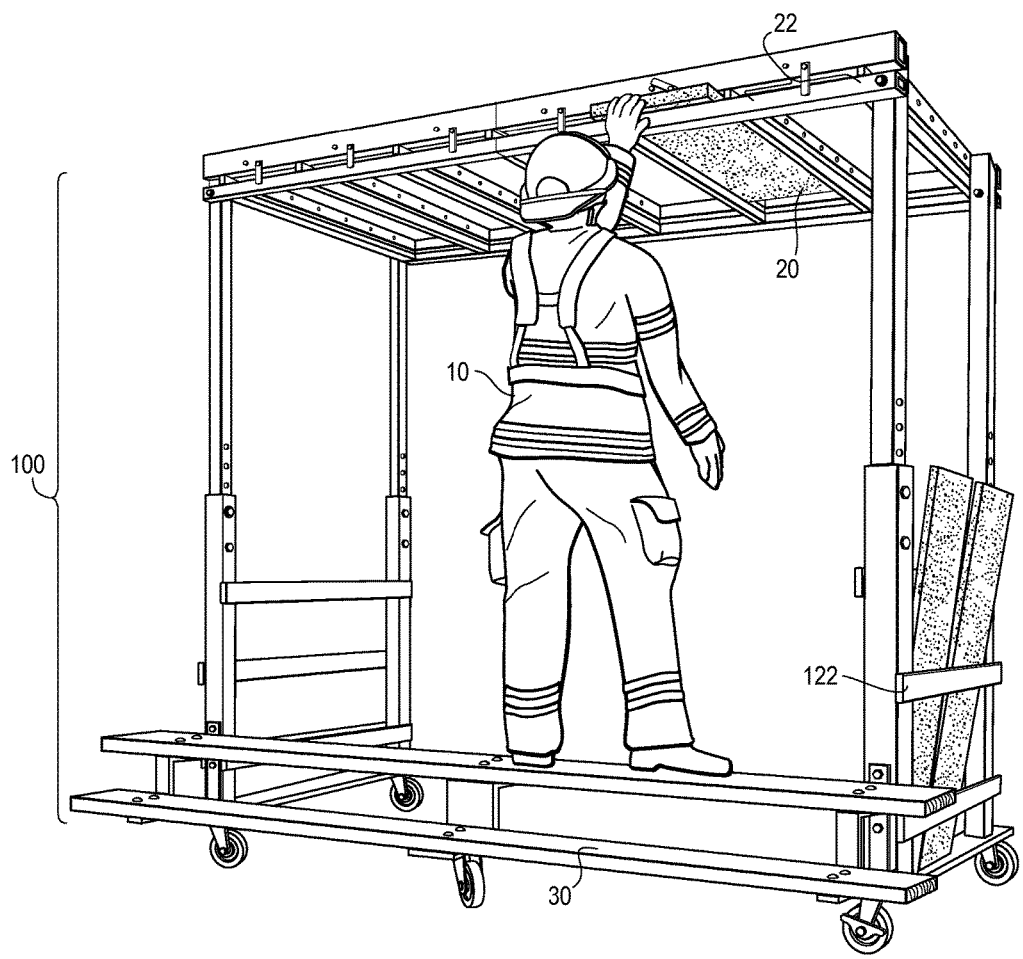
FIG. 1 is a perspective view of a firefighter trainer installing a drywall panel into the present firefighter training fixture.

FIG. 1 shows a firefighter trainer 10 placing a drywall panel 20 into compartment 22 of firefighter training fixture 100. A variety of materials can be used in place a drywall panels, including but not limited to, such as oriented strand boards, cement boards, plywood, ceiling tiles, and plaster boards.

In some embodiments, support braces (not shown) can be added to compartment 22 to increase its structural integrity. In some embodiments these braces are metal.

In some embodiments, firefighter training fixture 100 includes side storage compartment 122. Side storage compartment 122 can be used, for example, to store extra drywall panels 20 when in use during training Side storage compartment 122 can also be used to hold pike hooks (see pike hook 200 in FIG. 5) when not in use.

In some embodiments, firefighter training fixture 100 has step ladder 30 to aid in installing and removing drywall panel 20 into compartment 22. This is especially advantageous when firefighter training fixture 100 has been raised to simulate a high ceiling.

In some embodiments firefighter training fixture 100 can be placed on its side to simulate a wall instead of a ceiling. In other embodiments, firefighter training fixture 100 has a wall simulator compartment (not shown) that can be configured to hold drywall wall panels. These two embodiments allow firefighter trainees to practice wall breaches.

In certain embodiments, firefighter training fixture 100 can include a door compartment (now shown). The door compartment can be configured to hold a door that can be used to practice forcible-entries.

Figure 2:
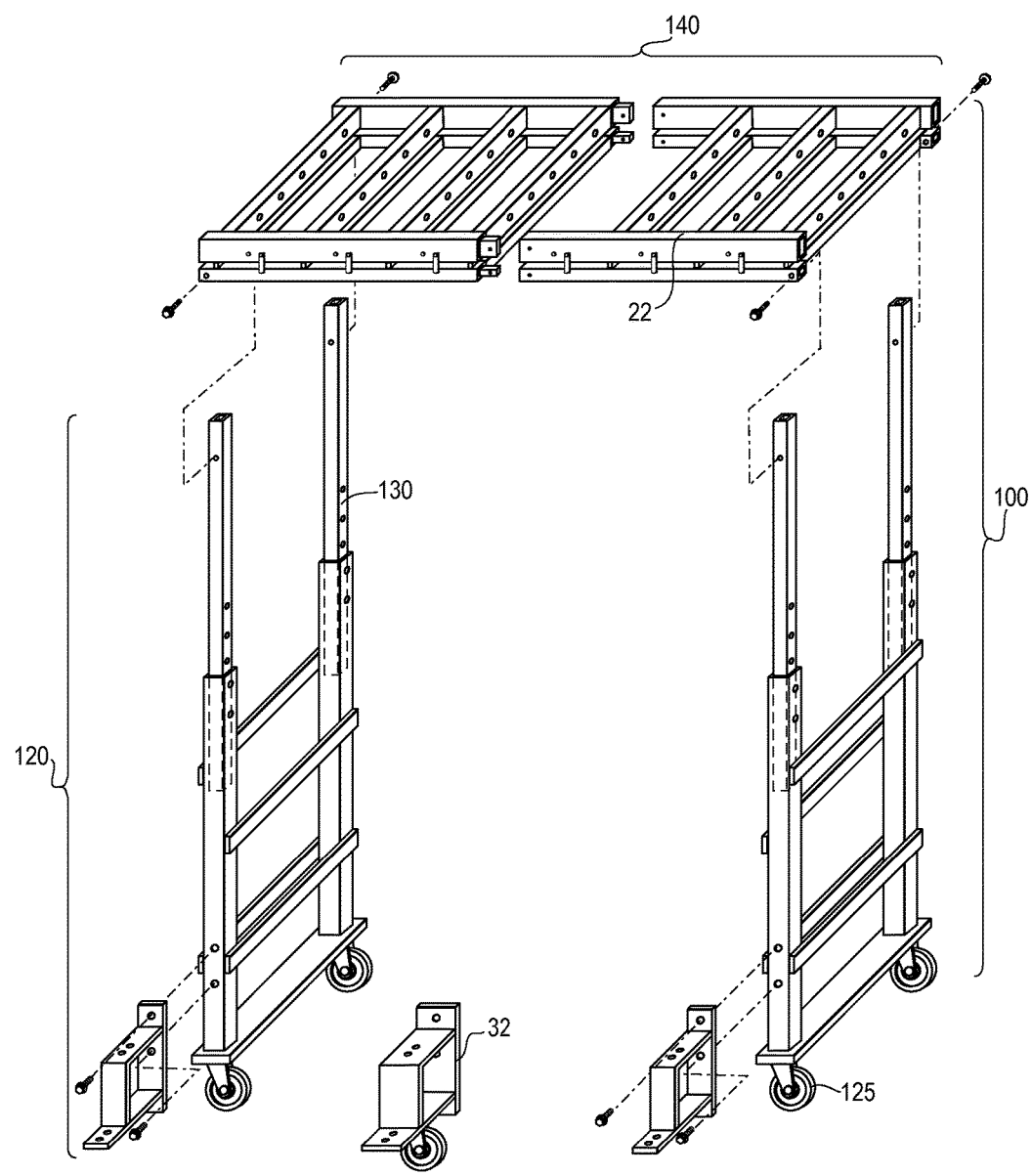
FIG. 2 is an exploded perspective view of the present firefighter training fixture.

FIG. 2 shows an exploded view of firefighter training fixture 100. Firefighter training fixture 100 can consist of two side sections 120. These side sections 120 can be made up of adjustable arms 130 to allow for ceiling section 140 to be placed at different heights.

In some embodiments, side sections 120 can include wheels 125 to make training fixture 100 easier to move. In certain embodiments, wheels 125 can lock into place so that training fixture 100 does not move around when in use. In some embodiments, step ladder 30 (see FIG. 1) can also be attached to side sections 120 using, among other methods, brackets 32.

Ceiling section 140 can include a plurality of compartments 22 for the insertion of various ceiling materials. In some embodiments, ceiling section 140 contains six compartments 22 that can be filled with 16 inch by 48 inch drywall panels which replicates the 16 inch center construction for joints and rafters.

In some embodiments, ceiling section 140 is configured to be readily disassembled into two or more pieces for easier storage and/or transportation.

Figure 3:
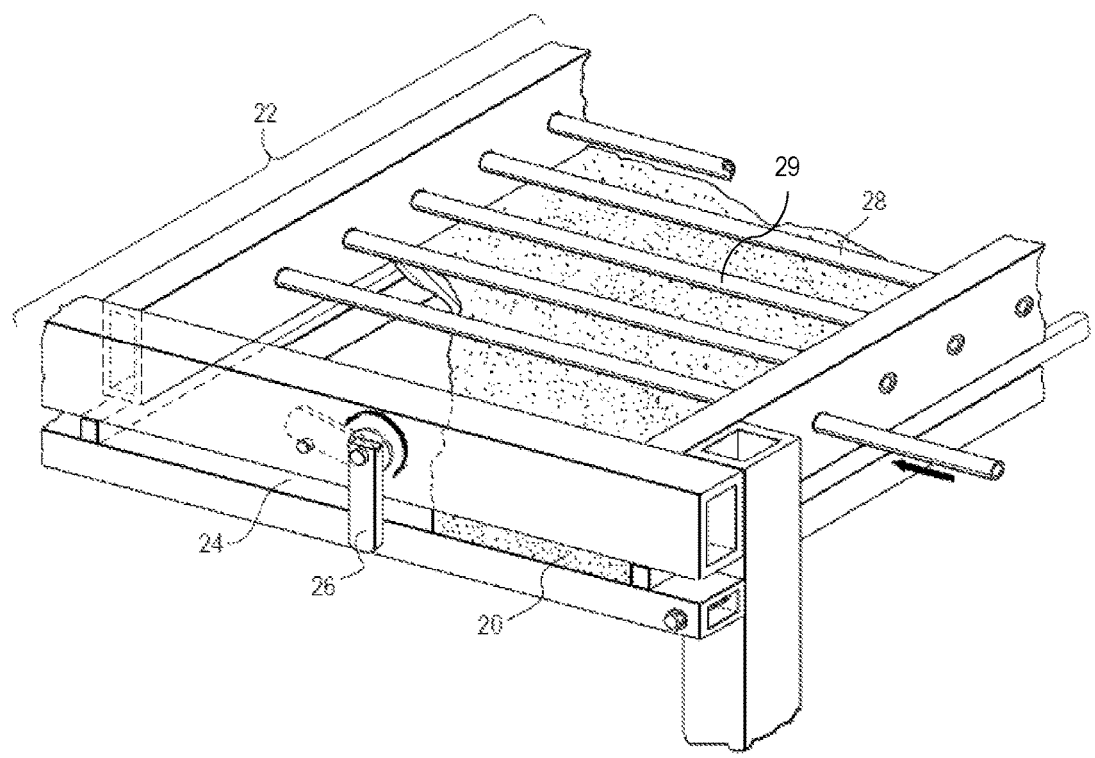
FIG. 3 is a perspective view of a compartment in the present firefighter training fixture for mounting a drywall panel or ceiling tile.

FIG. 3 shows a close up of compartment 22 of ceiling section 140. Drywall panel 20 has been placed into slot 24. In some embodiments locking mechanism 26 is used to keep drywall panel 20 in slot 24.

In some embodiments, piping 28 can be placed across compartment 22 to simulate electrical conduit that is often encountered by firefighters in the field.

In some embodiments, conduit 29 can be placed across compartment 22 to simulate a pressurized water utility pipe that is often encountered by firefighters in the field.

Figure 4:
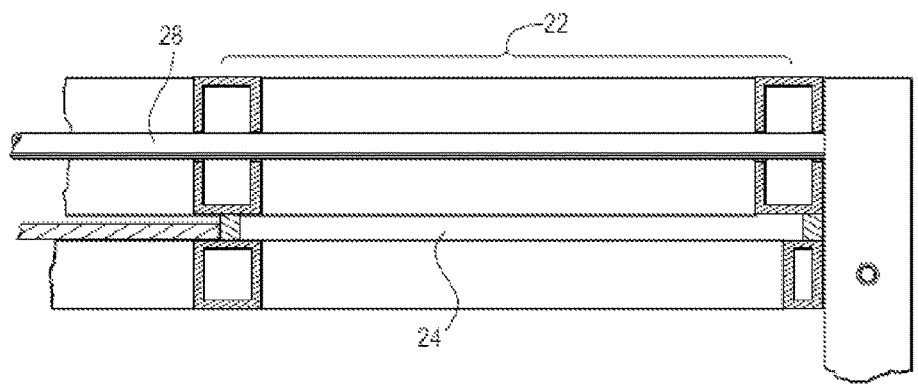
FIG. 4 is a front sectional view of a portion of the present firefighter training fixture.

FIG. 4 is a close up cutaway view of compartment 22. Slot 24 is readily distinguishable, as is piping 28. In some embodiments, slot 22 is configured to receive one-half inch (1.3 cm) drywall panels, although other thickness can be used as well.

Figure 5:
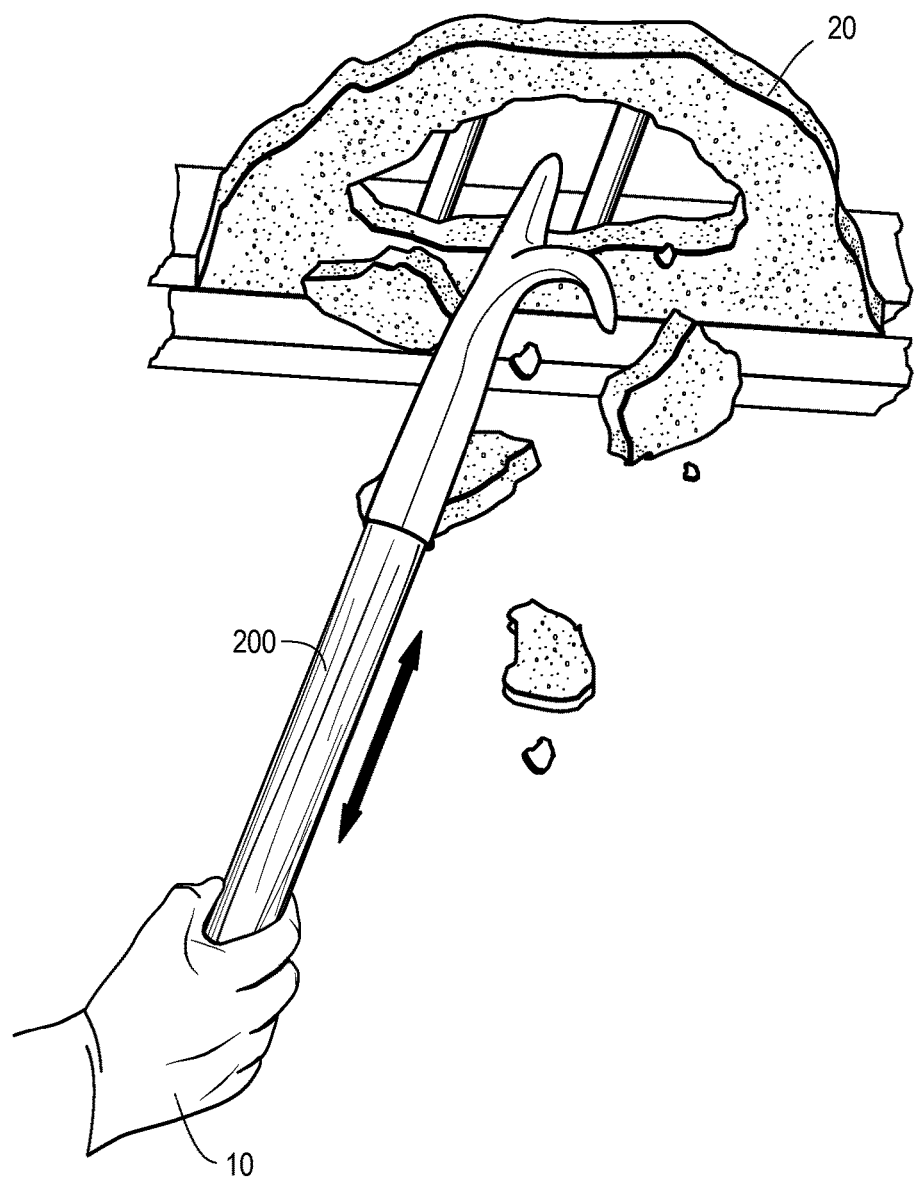
FIG. 5 is a perspective view of a firefighter trainee performing a ceiling pull using a pike hook.

FIG. 5 shows firefighter trainee 10 using pike hook 200 to break apart drywall panel 20.

While particular elements, embodiments and applications of the present invention have been shown and described, it will be understood, that the invention is not limited thereto since modifications can be made without departing from the scope of the present disclosure, particularly in light of the foregoing teachings.

What is claimed is:

1. A training fixture for simulating a ceiling comprising at least one panel, the training fixture comprising:
   (a) a pair of oppositely disposed upwardly extending side sections, wherein said side sections are adjustable in the vertical direction and have a wheel extending from a bottom portion of said side sections; and wherein one of said side sections comprises a side storage compartment configured to store a plurality of drywall panels;
   (b) a ceiling section interposed between an upper portion of each of said side sections, said ceiling section comprising at least one compartment for receiving said at least one panel, wherein said at least one compartment comprises
      (i) a first conduit extending therethrough, said first conduit holds an amount of water under pressure; and
      (ii) a second conduit extending therethrough, said second conduit surrounds an at least one wire;
   (c) an integral step ladder;
   (d) a wall simulator compartment, wherein said wall simulator compartment is configured to receive a wall panel; and
   (e) a door compartment, wherein said door compartment is configured to receive a door.

* * * * *